No. 810,690. PATENTED JAN. 23, 1906.
P. WEISS.
BIRD KITE.
APPLICATION FILED APR. 11, 1905.
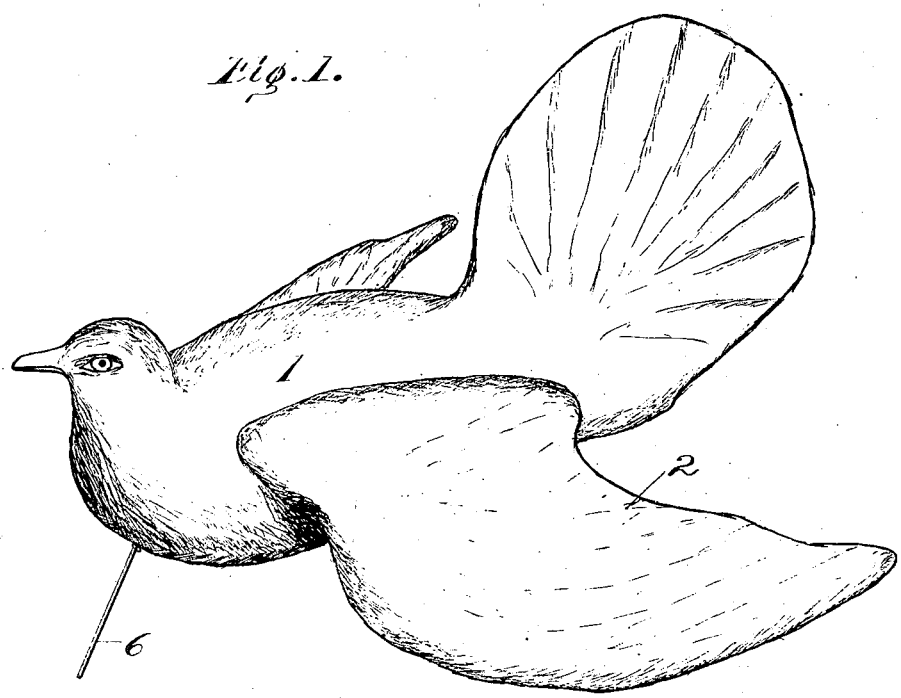
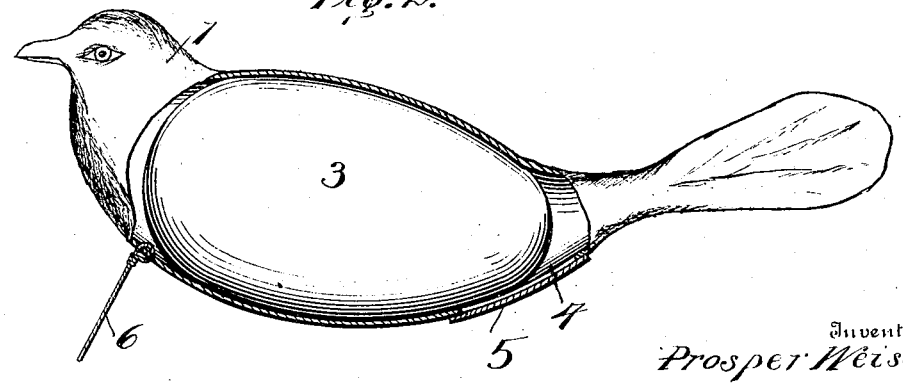
Inventor
Prosper Weiss.
Witnesses
By W. J. Fitzgerald & Co.
Attorneys

UNITED STATES PATENT OFFICE.

PROSPER WEISS, OF HIGHLAND FALLS, NEW YORK.

BIRD-KITE.

No. 810,690.  Specification of Letters Patent.  Patented Jan. 23, 1906.

Application filed April 11, 1905. Serial No. 255,066.

*To all whom it may concern:*

Be it known that I, PROSPER WEISS, a citizen of the United States, residing at Highland Falls, in the county of Orange and State of New York, have invented certain new and useful Improvements in Bird-Kites; and I do hereby declare the following to be a full, clear, and exact description of the invention, such as will enable others skilled in the art to which it appertains to make and use the same.

My invention relates to toys; and its object is to provide a device of this character which simulates a bird and is adapted to soar, the means for holding it in the air being concealed.

Another object is to provide a simple and inexpensive device of this character which is of attractive appearance.

With the above and other objects in view the invention consists of a casing of paper or other like material in the form of a bird, and this casing contains an inflated gas-bag of sufficient size to lift the casing in the air.

The invention also consists of a casing with wings somewhat similar to those of a bird and which can be caused to flap by pulling or jerking upon a cord or other flexible device connected to the casing.

The invention also consists of the further novel constructions and combinations of parts hereinafter more fully described, and pointed out in the claims.

In the accompanying drawings I have shown the preferred form of my invention.

In said drawings, Figure 1 is a perspective view of the device; and Fig. 2 is a section therethrough, showing the gas-bag in elevation.

Referring to the figures by numerals of reference, 1 is a casing in the form of a bird, and the same is provided with wings 2, of paper or other light material, which will normally remain outstretched from the body, but which will flap when the body is moved upward or downward. The entire casing is hollow and very light, and fitted tightly within the body portion thereof is a gas-bag 3, preferably formed of thin rubber and adapted to contain hydrogen or other light gas. This bag is inserted into the body through an opening 4 therein, and said opening can be subsequently closed by securing over it a strip of material similar to that of which the body is composed. A cord 6 is adapted to be secured to the body of the casing. The gas contained within the bag 3 will, as is obvious, raise the casing, and the movement thereof is controlled by the cord 6. By holding this cord the casing will be caused to assume a substantially horizontal position and by jerking it the wings 2 will be flapped, and therefore the entire divice will have the appearance of a bird in flight. It will be understood that the casing can be shaped to represent different kinds of birds. The entire device can be constructed at slight cost and forms an attractive toy.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. The combination with an inflatable body; of a covering inclosing the same and comprising a hollow casing simulating a winged creature, said casing having an opening adapted to receive the inflatable body, a closure for said opening adapted to conceal and protect the inflatable body, and a manipulating-cord permanently connected to the casing.

2. A covering for inflatable bodies comprising a hollow casing simulating a winged creature, said casing having an opening adjacent one end adapted to receive an inflatable body, a closure for said opening, and a manipulating-cord secured to said casing.

3. A covering for inflatable bodies comprising a hollow casing simulating a living creature and having an opening adapted to receive an inflatable body, flexible wings extending from the casing, a closure for the opening, and a manipulating-cord secured to and extending from the casing.

In testimony whereof I have signed my name to this specification in the presence of two subscribing witnesses.

PROSPER WEISS.

Witnesses:
WILLIAM STROPES,
JAMES McAULIFFE.